United States Patent [19]

Bliemeister

[11] 4,129,036

[45] Dec. 12, 1978

[54] ALIGNMENT INDICATOR FOR ROLLER-TYPE SUPPORT

[75] Inventor: Robert M. Bliemeister, Milwaukee, Wis.

[73] Assignee: Allis-Chalmers Corporation, Milwaukee, Wis.

[21] Appl. No.: 807,558

[22] Filed: Jun. 17, 1977

[51] Int. Cl.² ............................................. G01L 5/12
[52] U.S. Cl. ........................................ 73/140; 308/204
[58] Field of Search ............... 73/140; 33/181 R, 182; 340/269; 308/203, 204

[56] References Cited

U.S. PATENT DOCUMENTS

| | | |
|---|---|---|
| 1,347,348 | 7/1920 | MacMillan ............... 73/140 |
| 2,472,047 | 5/1949 | Ruge ...................... 73/141 A |
| 2,612,775 | 10/1952 | Lakey ..................... 73/140 |
| 2,783,645 | 3/1957 | Hornbostel ............ 73/136 R |
| 3,188,155 | 6/1965 | Kemnitz ................. 308/204 |

Primary Examiner—Charles A. Ruehl
Attorney, Agent, or Firm—Robert C. Jones

[57] ABSTRACT

A positive-acting mechanical device to constantly monitor the amount of thrust force on the bearing housing end plate of a roller support for a rotary kiln.

2 Claims, 4 Drawing Figures

U.S. Patent     Dec. 12, 1978     4,129,036
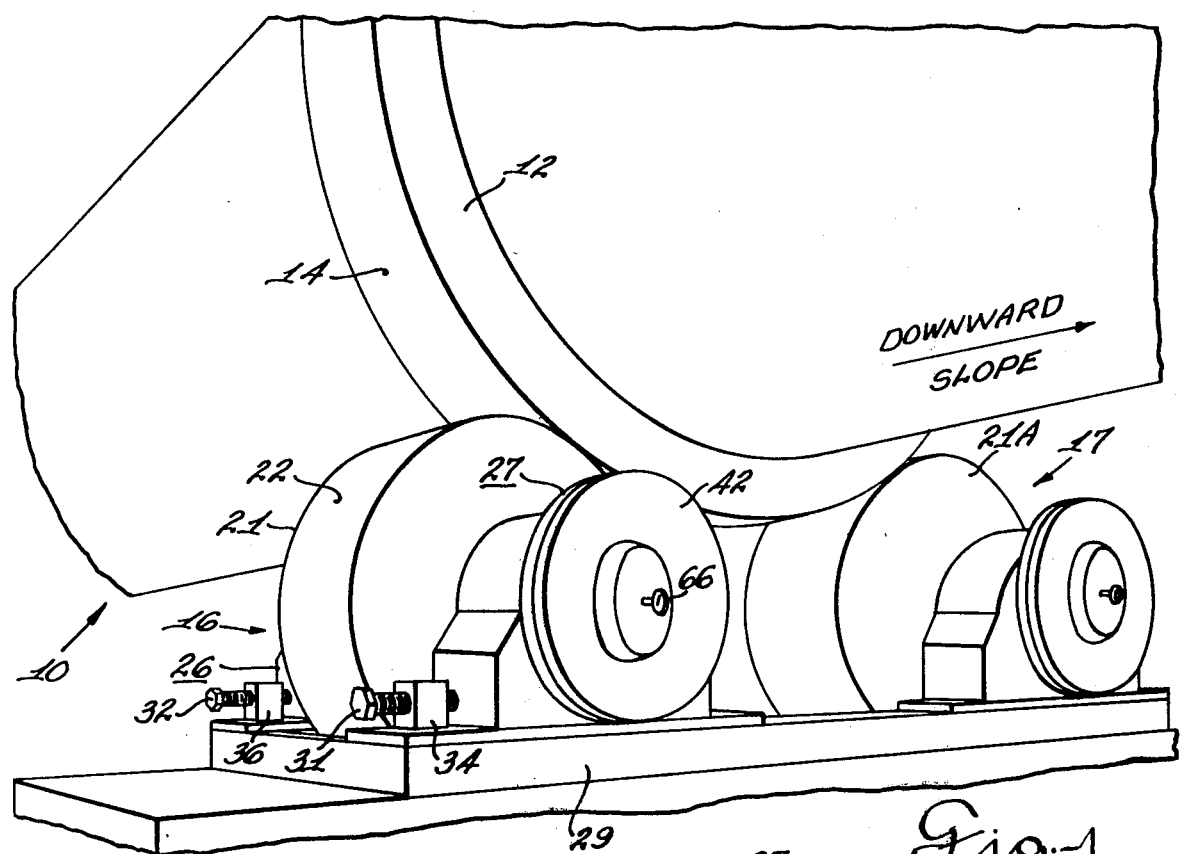
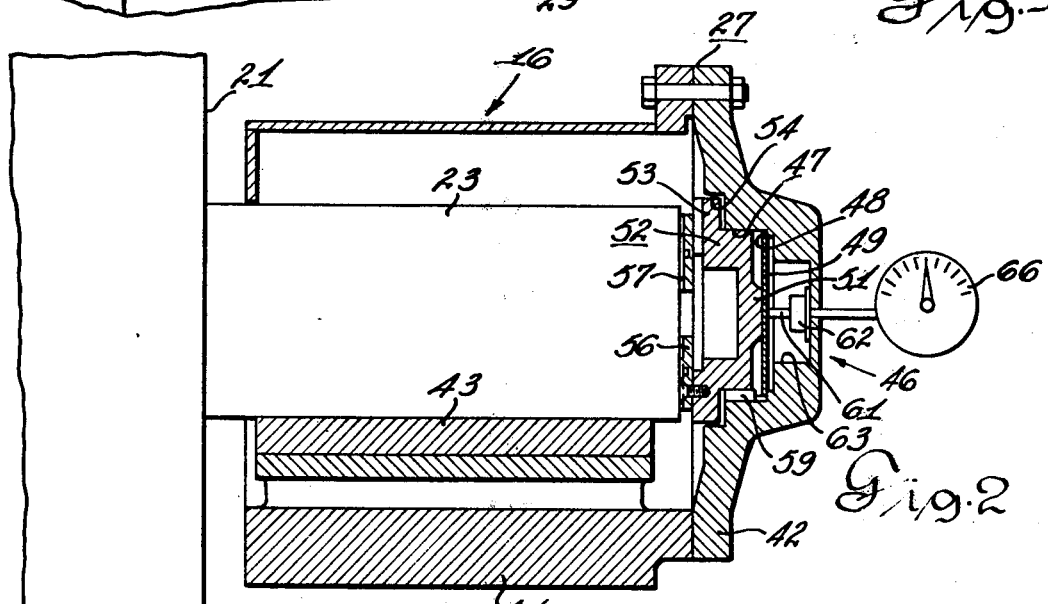
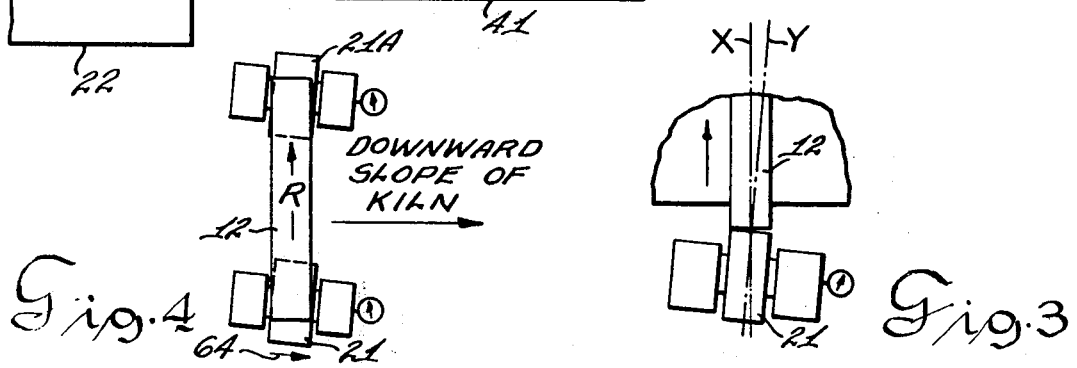

ABSTRACT

ALIGNMENT INDICATOR FOR ROLLER-TYPE SUPPORT

BACKGROUND OF THE INVENTION

This invention relates to an apparatus for determining proper alignment of a carrying roller, particularly a carrying roller utilized for supporting a large rotary apparatus such as a rotary kiln.

A large rotary apparatus such as a rotary kiln rotates about its longitudinal axis and is usually supported for such rotation by carrying rollers in contact with riding rings surrounding the rotary kiln at various points along the length of the kiln. Since the cost of replacing the riding rings or the carrying rollers, or both, is relatively high, one of the important considerations in the operation of a rotary kiln is the maintenance of proper alignment between the surface of the carrying roller and the riding ring to prevent uneven wearing of the surfaces. If the two are kept in proper alignment, a long life can be expected from both the riding ring and carrying roller.

In order to maintain proper alignment, it has heretofore been necessary to periodically, at rather short intervals, check the alignment by visual inspection or by sounding the bearing end covers with a hammer to determine roller axial position and then incrementally adjust the carrier roller shaft position until the roller shifted axial position indicating approximately parallel relationship between the roller axis and the kiln axis. This method is usually inadequate because the checks must be made relatively often, is difficult, inconvenient and in most instances it is not dependably carried out by the operator of the kiln.

A second method, according to the prior art, determines thrust by hydraulic sensing as is shown in U.S. Pat. No. 3,188,155. However, the hydraulic sensing is subject to failures such as leakage, which makes it necessary to shut the plant down to repair seals, and overheating of the fluid due to the proximity of a radiant heat source, the rotary kiln.

This invention accomplishes the determination of alignment of a kiln roller support constantly and mechanically and with an accuracy that greatly increases the life of the kiln riding rings and the kiln-carrying or support rollers.

SUMMARY OF THE INVENTION

A circular thrust displacement disc is supported so as to be deflected when a thrust plate is loaded by end thrust from the carrying roller shaft. A measuring device is provided which constantly indicates or senses the deflection of the displacement disc. Conversion of the sensed deflection will give end thrust forces and the support roller can be adjusted accordingly when these thrust forces exceed a predetermined amount.

DESCRIPTION OF THE DRAWINGS

FIG. 1 is a fragmentary perspective view showing support rollers for a portion of a rotary kiln;

FIG. 2 is an enlarged fragmentary detail view of the alignment indicating means associated with the support rollers of FIG. 1;

FIG. 3 is an exaggerated simplified showing of a carrying roller and riding ring when the two are not in alignment; and, FIG. 4 is an exaggerated plan view of the riding ring and associated supporting rollers when the components are not in alignment and produce a thrust of the carrying roller shafts in a downward slope direction.

DESCRIPTION OF THE INVENTION

Referring to FIG. 1, an inclined rotary kiln 10 having a riding ring 12 that is provided with a circumferential bearing surface 14 which is parallel to the longitudinal axis of the kiln 10 is supported by a pair of roller mechanisms or supports 16 and 17. The support 16 is identical to support 17 and thus a description of the support 16 will also apply to support 17. The roller support 16 has a cylindrical carrying roller 21 with a bearing surface 22 which is in supporting engagement with the bearing surface 14 of riding ring 12. The roller 21 has an upward roller shaft extension (not shown) and a downward shaft extension 23, FIG. 2. The upward shaft extension (not shown) is carried in a movable bearing housing structure 26 while the downward shaft extension 23 is supported in a movable bearing housing structure 27. The bearing housing structures 26 and 27 are carried for positionable in-and-out movement in a direction transverse to the longitudinal axis of the kiln 10. To this purpose, the bearing housing structures are mounted on a base 29 for movement thereon by means of adjusting screws 31 and 32 which are connected to the base 29 through adjusting lugs 34 and 36.

As shown in FIG. 1, the opposite roller support 17 arrangement is duplicated on the opposite side of the rotary kiln 10 by an arrangement identical to that of the roller support 16 arrangement.

Referring now to FIG. 2, a cross-section of the downward bearing housing structure 27 shows a bearing housing 41 and a closure plate or end cover 42. A bearing bushing 43 is disposed within housing 41 and arranged to provide a rotatable lubricated support for the downward shaft 23.

An alignment indicator arrangement, generally indicated at 46, is disposed within the closure plate 42 to respond to thrust of the downward shaft 23. To this purpose, the closure plate 42 is provided with a machined bore 47, the axis of which is parallel to the axis of the shaft 23. In forming the bore 47 a circular shoulder 48 is constructed. A deflectable displacement disc 49 of the diameter of the bore 47 is disposed within the bore abutting the circular shoulder 48. Abutting the displaceable disc 49 is an axially extending hub 51 of a movable piston 52 housed within the bore 47 of the closure plate 42. The piston 52 is provided with a radial flange 53 that is received in a counterbore 54 formed in the closure plate 42. A thrust washer 56 having a plurality of radially extending oiling grooves 57 is secured to the axial inner end surface of the flange 53 of the piston 52. The arrangement is such that the surface of the thrust washer 56 in which the radial oiling grooves 57 are formed abuts an axial end surface of the shaft 23. The piston 52 is prevented from rotating within the bore 47 by operation of a key 59. Thus, the piston is not rotatable but is free to move axially.

In operation the rotary kiln 10 rotates about its longitudinal axis and is supported by riding ring 12 with its surface 14 bearing on the rollers 21 and 21A of the roller support mechanisms 16 and 17. As the kiln 10 is rotating, it causes support roller 21 to rotate due to the contact between the riding ring 12 and the roller 21 and the weight of the kiln 10 is transferred through shafts such as the shaft 23. For the most efficient operation and proper wearing of the riding ring surface 14, the bearing surface 14 and the support roller surface 22 should meet in parallel relationship so that both surfaces will wear evenly and remain parallel with respect to each other. Thus, for the preferred operating condition, such as exemplified in FIG. 1, the displacement disc 49 will be calibrated to remain virtually undeflected when the thrust from the shaft 23 is established at the proper amount wherein the surface 22 of support roller 21 and the surface 14 of riding ring 12 are in parallel bearing engagement with the kiln 10 in downslope position. Under this condition, the force from the shaft 23 through the thrust plate 56 to the piston 52 and thence to the displacement disc 49 will be due only to the weight of the roller and shaft assembly and such that no deflection of the displacement disc occurs. Thus, an axial movable shaft 61 of a deflection or load measuring device 62 carried within a suitable chamber 63 formed in the closure plate 42 will not be displaced. As a result, a reference point can be noted on an associated indicator dial 66 located externally of the bearing closure plate 42.

When the support roller 21 is in a skewed position, as indicated by the dash-and-dot line Y in FIG. 3, the supporting roller bearing surface 22 is not parallel to the bearing surface 14 of the riding ring 12 and a force will be exerted upon the supporting roller 21 because of the angular conjunction of the riding ring bearing surface and the supporting roller bearing surface. If this misalignment occurs, a lateral force upon the support roller 21 will be created in a direction toward the downward end of the kiln and indicated by the arrow 64 in FIG. 4 associated with the support roller 21. When this occurs, the force of the shaft will be communicated to the piston 52 which will move axially to the right as viewed in FIG. 2. This movement of the piston will cause an outward deflection of the displacement disc 49. The force on the displacement disc 49 will be sensed by the load measuring device 62 and will be indicated on the indicator dial 66. The proper alignment of the support mechanism 16 may then be accomplished by moving the bearing housing 27 inwardly or bearing housing 26 outwardly along the base 29 by operating the adjusting screw 30 or 32, respectively. This adjustment will continue until the force indicated on dial 66 is again the previously noted or marked reading. The alignment determination of either of the support mechanisms 16 and 17 is accomplished in the same manner.

It is apparent that this invention provides the kiln operator with a constant source of information on the relationship of the supporting rollers with respect to its associated riding ring. With this information prompt action can be taken to eliminate misalignment and thereby increase the usable life of the components.

The embodiments of the invention in which an exclusive property or privilege is claimed are defined as follows:

1. An alignment indicating roller support assembly for a rotary kiln comprising:
   a base;
   a housing movably supported on said base;
   a roller support having a shaft projecting outwardly therefrom and journaled in said housing, said housing enclosing the free end of said shaft;
   a closure plate secured to the end of said housing, said closure plate and said housing defining a chamber;
   a force transmitting piston disposed within said chamber in axial alignment with said shaft, said piston being in force receiving relationship with respect to said shaft to move therewith in a direction parallel to the axis of said shaft for transmitting the force executed thereto by said shaft;
   a thrust washer between the axial end of said shaft and the adjacent end of said piston; and,
   a mechanical force sensing means within said chamber in position to sense the thrust force exerted on said force transmitting piston by said shaft;
   indicating means carried externally of the chamber by said closure plate and operably connected to said mechanical sensing means to indicate the relative amount of the force sensed by said mechanical sensing means; and,
   a deflection plate within said chamber and interposed between the opposite end of said piston and said mechanical force sensing means, said deflection plate being operative to deflect when loaded by the end thrust from the roller support shaft as transmitted by said piston to thereby operate said mechanical force sensing means which operates said indicating means to indicate the amount of the force for a visual indication of the degree of misalignment between the axis about which said roller support rotates and the axis about which said kiln rotates;
   adjusting means for moving said housing structure on said base to effect a positioning movement of said roller support for positioning the axis about which said roller support rotates in a plane which is substantially parallel to the axis about which said kiln rotates to thereby counteract the axial thrust force exerted by said shaft and reestablish the rolling supporting relationship between the kiln and said supporting roller;
   whereby said indicating means will indicate an amount of force which is indicative of the desired supporting relationship between said support and said kiln and the adjustment of the roller support can be effected to reestablish the parallel relationship between the two axes of rotation.

2. In a rotary kiln having a riding ring secured to its external surface;
   a base;
   a roller support mechanism mounted on said base in position to engage with said riding ring for supporting said kiln for rotation about an axis which is inclined relative to said base;
   said roller support mechanism including a roller with a shaft extension projecting from each axial end and defining an axis about which said roller rotates;
   a bearing structure for rotatably supporting each shaft extension supported by the base for carrying the roller with its axis substantially parallel to the inclined axis about which the kiln rotates;
   a housing enclosing each shaft extension and its associated bearing structure;
   a chamber within said housing associated with the downward shaft extension;
   a movable piston within said chamber in axial alignment with said shaft extension;
   a thrust washer carried by said piston in axial abutting relationship with the axial end of said shaft extension, said thrust washer and said piston operating to receive end thrust from said shaft;
   a calibrated circular deflection plate within said chamber and disposed at the opposite end of said piston;
   a mechanical force sensor within said chamber in position to be actuated by the deflection of said deflector plate to sense the force of the thrust from the end of the roller support extension shaft;

an indicator connected to be actuated by said mechanical force sensor to indicate the amount of the thrust force; and, adjusting means associated with each housing for moving said housings on said base to thereby change the relationship of the axis about which said roller support rotates relative to the axis about which said kiln rotates and thereby offset the thrust force of said shaft extension;

whereby said indicator will return to its original indication signifying that desired alignment has been established.

* * * * *